(12) United States Patent
Michalakis

(10) Patent No.: US 10,611,378 B2
(45) Date of Patent: Apr. 7, 2020

(54) SYSTEMS AND METHODS FOR OPERATING A VEHICLE ON A ROADWAY

(71) Applicant: Toyota Research Institute, Inc., Los Altos, CA (US)

(72) Inventor: Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 431 days.

(21) Appl. No.: 15/422,008

(22) Filed: Feb. 1, 2017

(65) Prior Publication Data

US 2018/0218606 A1 Aug. 2, 2018

(51) Int. Cl.
| | |
|---|---|
| *B60W 40/04* | (2006.01) |
| *G05D 1/02* | (2020.01) |
| *B60W 30/09* | (2012.01) |
| *G06K 9/00* | (2006.01) |
| *G06K 9/20* | (2006.01) |
| *B60W 30/10* | (2006.01) |
| *G08G 1/16* | (2006.01) |
| *G06K 9/32* | (2006.01) |

(52) U.S. Cl.
CPC .......... *B60W 40/04* (2013.01); *B60W 30/09* (2013.01); *B60W 30/10* (2013.01); *G05D 1/0234* (2013.01); *G06K 9/00791* (2013.01); *G06K 9/00805* (2013.01); *G06K 9/2063* (2013.01); *B60W 2530/00* (2013.01); *B60W 2550/30* (2013.01); *B60W 2550/408* (2013.01); *G05D 2201/0213* (2013.01); *G06K 2009/3225* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 4,908,500 | A | * | 3/1990 | Baumberger ........ G06K 7/1092 235/384 |
| 5,682,030 | A | | 10/1997 | Kubon |
| 7,027,612 | B2 | | 4/2006 | Patterson et al. |
| 8,078,349 | B1 | * | 12/2011 | Prada Gomez ...... G05D 1/0061 701/1 |
| 8,180,561 | B2 | | 5/2012 | Osanai |
| 8,461,804 | B1 | | 6/2013 | Capizzo |

(Continued)

FOREIGN PATENT DOCUMENTS

| | | | |
|---|---|---|---|
| CN | 1329712 C | 12/2004 | |
| DE | 102013222092 A | * 4/2015 | ............. B60L 53/60 |

(Continued)

*Primary Examiner* — David P. Merlino
(74) *Attorney, Agent, or Firm* — Christopher G. Darrow; Darrow Mustafa PC

(57) ABSTRACT

A host vehicle can detect two or more markers positioned on respective locations of a surrounding vehicle. The two or more markers can include data corresponding to the respective locations of each of the two or more markers. The host vehicle can determine the location of the two or more markers based on the data. Based on the location of the two or more markers, the host vehicle can determine the orientation of the surrounding vehicle. The host vehicle can determine a path to follow based on the determined orientation of the surrounding vehicle. The host vehicle can then follow the determined path.

11 Claims, 7 Drawing Sheets

(56) References Cited

U.S. PATENT DOCUMENTS

| | | |
|---|---|---|
| 9,069,653 B2 | 6/2015 | Be et al. |
| 9,146,898 B2 | 9/2015 | Ihlenburg et al. |
| 9,169,114 B2 | 10/2015 | Butler, Jr. |
| 2002/0188388 A1* | 12/2002 | Taguchi ................ G08G 1/161 701/23 |
| 2004/0054473 A1* | 3/2004 | Shimomura .......... G01S 3/7865 701/301 |
| 2007/0138287 A1* | 6/2007 | Lombardi ............. B66F 9/0755 235/462.13 |
| 2009/0132165 A1* | 5/2009 | Gabrielsson .......... E01C 19/004 701/300 |
| 2014/0022068 A1 | 1/2014 | Usami |
| 2014/0277691 A1* | 9/2014 | Jacobus ............... G06Q 10/087 700/216 |
| 2016/0217581 A1 | 7/2016 | Su et al. |
| 2016/0318415 A1* | 11/2016 | Salasoo ................ G05D 1/0225 |
| 2016/0327404 A1 | 11/2016 | Israelsson et al. |
| 2017/0132561 A1* | 5/2017 | High ................... G06Q 10/0832 |
| 2018/0127027 A1* | 5/2018 | Brennan ................ B62D 13/06 |

FOREIGN PATENT DOCUMENTS

| | | | |
|---|---|---|---|
| JP | H10255019 A | | 9/1998 |
| JP | 2010185769 A | | 8/2010 |
| JP | 2012256235 A | * | 12/2012 |
| WO | 2008007076 A1 | | 1/2008 |
| WO | 2015172770 A1 | | 11/2015 |

* cited by examiner

SYSTEMS AND METHODS FOR OPERATING A VEHICLE ON A ROADWAY

TECHNICAL FIELD

The subject matter described herein relates in general to operating a host vehicle on a roadway and, more particularly, to operating a host vehicle on a roadway according to a determined orientation of a surrounding vehicle.

BACKGROUND

Many modern vehicles include one or more sensors. Some of these sensors are configured to monitor an external environment of a host vehicle. In one or more arrangements, the one or more sensors are cameras. Cameras operate by detecting light reflected off of various surfaces. In some examples, the light detected by the cameras is from a surface of a vehicle surrounding the host vehicle. Depending on fluctuations and variations in lighting conditions, the cameras (and other sensors on the vehicle) may not be operating in optimal or even near-optimal conditions. In these conditions, it may be difficult to detect the surrounding vehicles.

SUMMARY

One embodiment includes a system for operating a host vehicle on a roadway. The system can include a camera positioned to capture an image of an external environment of the host vehicle. The system can also include one or more processors communicably coupled to the camera. The system can also include a memory communicably coupled to the one or more processors. The memory can store a marker location determination module including instructions that, when executed by the one or more processors, cause the one or more processors to detect, using the image captured by the camera, a first marker and at least a second marker positioned on one or more surfaces of a vehicle surrounding the host vehicle. The marker location determination module can also include instructions to determine at least a location of the first and second markers on the surrounding vehicle based on data encoded in each of the markers. The memory can further store an orientation determination module including instructions that, when executed by the one or more processors, cause the one or more processors to determine an orientation of the surrounding vehicle based on the location of the first and second markers. The memory can further store an autonomous driving module including instructions that, when executed by the one or more processors, cause the one or more processors to determine a path for the host vehicle based on the orientation of the surrounding vehicle, and to control the host vehicle to follow the determined path by sending one or more control signals to one or more vehicle components to cause the host vehicle to travel along the determined path.

Another embodiment includes a method of operating for a host vehicle according to an orientation of a surrounding vehicle. The method can include detecting, via a camera on the host vehicle, a first marker positioned on a surface of a surrounding vehicle, the first marker including data corresponding to the first marker's location on the surrounding vehicle. The method can also include determining the location of the first marker on the surrounding vehicle based on the data. The method can also include detecting, via the camera, a second marker positioned on another surface of the surrounding vehicle, the second marker including data corresponding to the second marker's location on the surrounding vehicle. The method can also include determining the location of the second marker on the surrounding vehicle based on the data. The method can also include determining an orientation of the surrounding vehicle based on the location of the first and second markers. The method can also include determining a path for the host vehicle based on the orientation of the surrounding vehicle. The method can also include causing the host vehicle to follow the determined path.

Another embodiment includes a system for providing information from a first vehicle to at least a second vehicle related to one or more features of the first vehicle. The system can include a marker positioned on an external surface of the first vehicle, the marker including data corresponding to the marker's location on the first vehicle. The system can include a communications system. The system can also include one or more processors. The system can also include a memory communicably coupled to the one or more processors. The memory can store a feature detection module including instructions that, when executed by the one or more processors, cause the one or more processors to detect one or more features corresponding to an area of the first vehicle proximate the location of the marker. The memory can store a data generation module including instructions that, when executed by the one or more processors, cause the one or more processors to generate data for the marker representing the determined one or more features by the feature detection module, and to transmit, via a communications system, the data for the marker corresponding to the detected one or more features, the data being accessible by the second vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems and methods for a host vehicle determining an orientation of a vehicle surrounding the host vehicle are disclosed herein. The host vehicle can detect two or more markers positioned on relative surfaces of the surrounding vehicle. The two or more markers can include data corresponding to the respective locations of each of the two or more markers. The host vehicle can determine the location of the two or more markers based on the data. The host vehicle can determine the orientation of the surrounding vehicle based on the location of the two or more markers. In one or more arrangements, the host vehicle can also receive data generated by the surrounding vehicle. The data generated by the surrounding vehicle can correspond to an area of the surrounding vehicle located proximate to at least one of the two or more markers. The host vehicle can determine a path to follow based on the orientation and, optionally, the data generated by the surrounding vehicle. The host vehicle can then follow the determined path.

Figure 1:
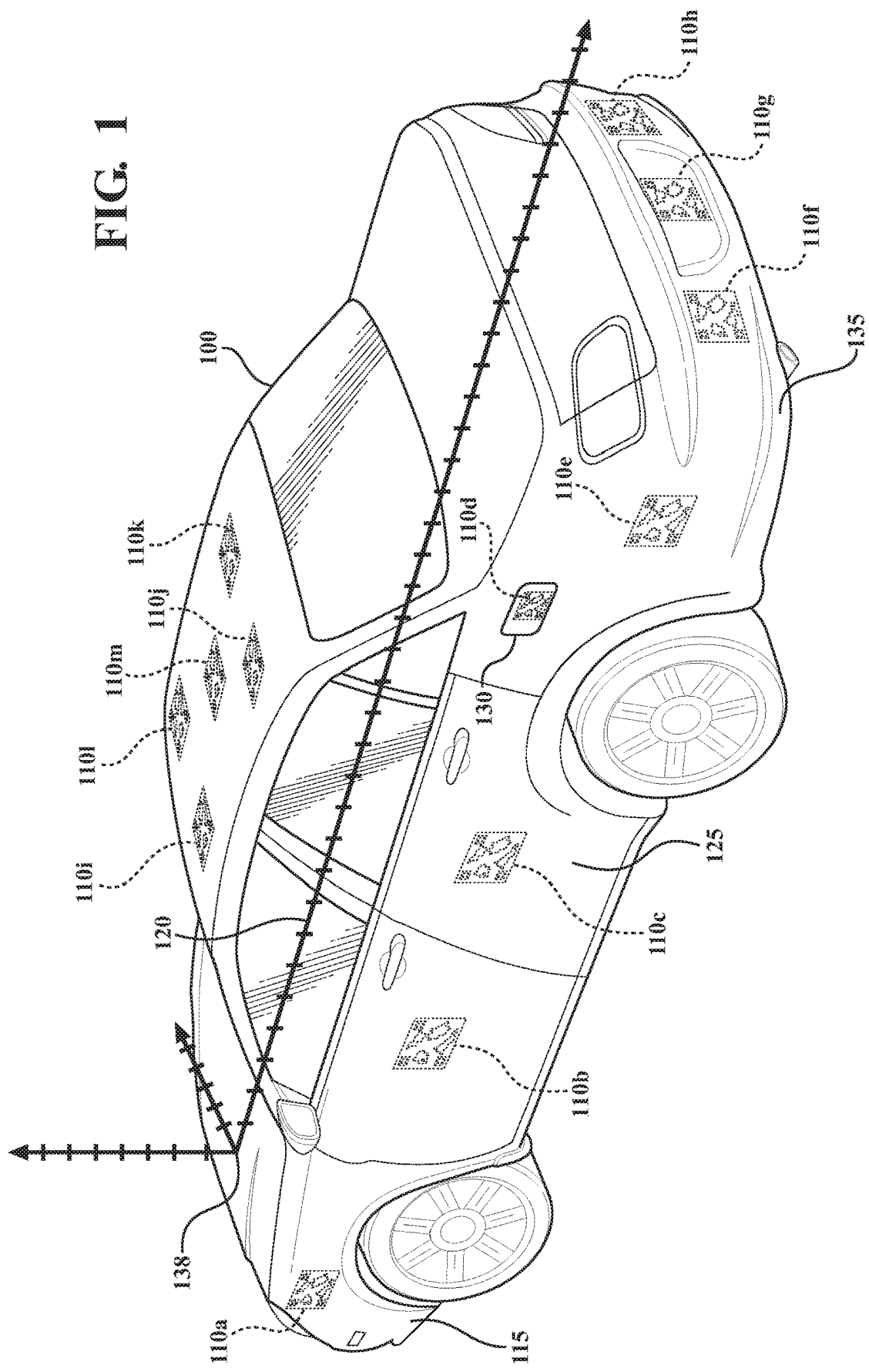
FIG. 1 illustrates a side view of a surrounding vehicle including a plurality of markers.

Referring to FIG. 1, an example of a surrounding vehicle 100 is illustrated. As used herein, a "vehicle" is any form of motorized transport. In one or more implementations, the surrounding vehicle 100 is an automobile. While arrangements will be described herein with respect to automobiles, it will be understood that embodiments are not limited to automobiles. The surrounding vehicle 100 includes a plurality of markers 110. Although a plurality of markers 110 are shown in FIG. 1, in some examples, the surrounding vehicle 100 may only include one marker 110. The markers 110 can be positioned on various surfaces of the surrounding vehicle 100. The markers 110 can be glued, adhered, painted, dyed, or otherwise attached to various surfaces of the surrounding vehicle 100. In one or more arrangements, the markers 110 can be non-visible markers (e.g., reflect light outside the visible light spectrum). Visible light spectrum, as used herein, includes a portion of the electromagnetic spectrum that is visibly perceivable by humans. As such, the markers 110 may reflect light outside the visible light spectrum and thereby not visibly perceivable by humans. In one or more arrangements, the markers 110 can be, for example, ultraviolet (UV) or infrared (IR) paints that reflect light in the UV or IR spectrum, respectively.

In one or more arrangements, the markers 110 can include a steganographic pattern. "Steganographic pattern", as used herein, includes any message, data, or the like that is formed as a pattern that is detectable by detecting software. In one or more arrangements, the steganographic pattern can be, for example, a QR code, a bar code, etc. In one or more arrangements, the markers 110 can include text that is readable by detecting software, such as optical character recognition software, for example. The steganographic pattern can be used to provide information to other vehicles, for example. In one or more arrangements, the steganographic pattern may include redundancies. The redundancies may permit data to be extrapolated from the steganographic pattern, even if the steganographic pattern is damaged (e.g., through scratching, collision, etc.). In one or more arrangements, the steganographic pattern may include encoded authentication information. In these arrangements, the steganographic pattern may be decoded to determine whether the steganographic pattern is an original, authentic pattern.

As shown in FIG. 1, there can be several markers 110 positioned on the surrounding vehicle 100, each of the markers 110 corresponding to a relative surface of the surrounding vehicle 100. For example, the surrounding vehicle 100 can include a marker 110a positioned on a driver-side corner of front bumper 115. The surrounding vehicle 100 can include a marker 110b positioned on a driver door 120. The surrounding vehicle 100 can include a marker 110c positioned on the driver-side backseat door 125. The surrounding vehicle 100 can include a marker 110d positioned on the fuel door 130. The surrounding vehicle 100 can include a marker 110e positioned on the driver-side corner of the rear bumper 135. Furthermore, the surrounding vehicle 100 can include markers on the left (110f), center (110g), and right (110h) portions of the rear bumper 135. Additionally, the surrounding vehicle 100 can include markers 110i-m positioned at various locations on the roof the surrounding vehicle 100. While these examples are shown, the surrounding vehicle 100 can include markers 110 at other various locations on the surrounding vehicle 100 including but not limited to the front passenger door, rear passenger door, the trunk, etc. Additionally, the surrounding vehicle 100 does not necessarily include all the markers 110 shown in FIG. 1, and therefore the present disclosure should not be limited to these positions. Furthermore, the surrounding vehicle 100 can include additional markers 110 not shown in FIG. 1. In one or more arrangements, the markers 110 can be positioned in close proximity to one another, such that two or more markers 110 may be observable at any given time and at any orientation of the surrounding vehicle 100.

Each of the markers 110 can include data that corresponds to the location of the marker 110 on the surface of the surrounding vehicle 100. In the example shown in FIG. 1, marker 110a can include data corresponding to the location of marker 110a on the driver-side corner of front bumper 115. For example, the marker 110a can include data that indicates its relative location on a vehicle grid 138. In one or more arrangements, the center of the vehicle grid 138 can be a point on an exterior surface of the surrounding vehicle 100. In another example, the center of the vehicle grid 138 can be the center of mass of the surrounding vehicle 100. In one example, the marker 110a can include data indicating that it is the center of the vehicle grid 138, and that all the remaining markers 110b-110e have local coordinates that are in reference to marker 110a. In one example, the local coordinates can be actual physical measurements (e.g., inches, centimeters, etc.) from the marker 110a. In another example, the local coordinates can be unit measurements (e.g., number of units) from the marker 110a. In both of these examples, markers 110b-110e can include data that indicates that they are located (X, Y, Z) units from marker 110a. While these examples are disclosed, it should be understood that any of the markers 110 can include data indicating that it is the center of the vehicle grid 138, and the remaining markers 110 can include data indicating their relative position from the center of the vehicle grid 138. Furthermore, there may be multiple centers of the vehicle grid 138, such that a plurality of origins may be detected. In these examples, another vehicle may be able to determine an origin of the vehicle grid 138 even when observing the surrounding vehicle 100 at different angles.

In one or more arrangements, each of the markers 110 can include data that identifies the surface that it is positioned on (e.g., the driver-side corner of front bumper 115 for marker 110a, driver door 120 for marker 110b, fuel door 130 for marker 110d, etc.). The data can include, for example, machine-readable text or code that states the ordinary name of the surface that each marker 110 is positioned on. Continuing the example of marker 110a, the data can indicate "driver-side corner of front bumper". Additionally or alternatively, the data can include a tag that corresponds to the driver-side corner of the front bumper 115 (or other surface of the surrounding vehicle 100). In this example, a look-up table can include a plurality of tags and their associated surfaces of the surrounding vehicle 100. Each marker 110 can include data indicating its respective tag, and another vehicle can access the look-up table to determine which surface the marker 110 is positioned on.

While the previous examples of various forms of markers 110 have been described, many other forms of markers 110 can be used for indicating the surface that each respective marker 110 is positioned on. As will be discussed in greater detail below, this data is usable by another vehicle to determine, at least, an orientation of the surrounding vehicle 100. Additionally, the markers 110 can further include data that identifies the surrounding vehicle 100. This identifying data can include, for example, data corresponding to the surrounding vehicle 100, such as the vehicle identification number (VIN), the license plate, etc. As will be discussed in greater detail below, this identifying information can be used to determine other features related to the surrounding vehicle 100.

Figure 2:
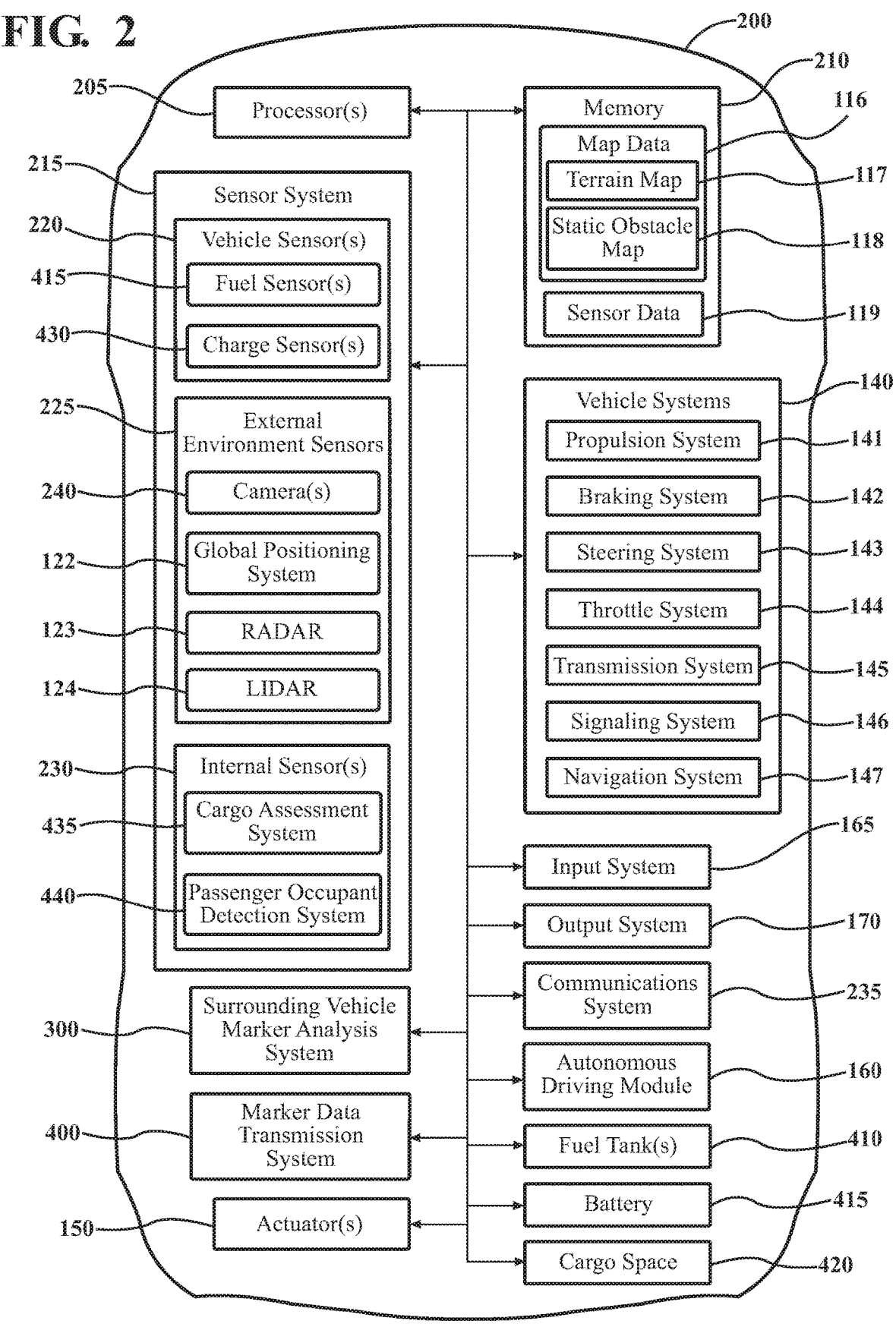
FIG. 2 illustrates a schematic view of a host vehicle.

Referring now to FIG. 2, an example of a vehicle is shown. For purposes of clarity, the vehicle shown in FIG. 2 will be referred to as a host vehicle 200. The host vehicle 200 can be configured to monitor an environment external to the host vehicle 200. The surrounding vehicle 100 can be located in the external environment, and the surrounding vehicle 100 can include the markers 110 as previously described. It should be noted that the surrounding vehicle 100 can include some and/or all of the elements described with reference to the host vehicle 200. Likewise, the host vehicle 200 can include its own markers 110 positioned on various surfaces of the host vehicle 200.

The host vehicle 200 includes various elements. It will be understood that, in various embodiments, it may not be necessary for the host vehicle 200 to have all the elements shown in FIG. 2. The host vehicle 200 can have any combination of the various elements shown in FIG. 2. Further, the host vehicle 200 can have additional elements to those shown in FIG. 2. In some arrangements, the host vehicle 200 may be implemented without one or more of the elements shown in FIG. 2. Further, while the various elements are shown as being located within the host vehicle 200 in FIG. 2, it will be understood that one or more of these elements can be located external to the host vehicle 200. Further, the elements shown may be physically separated by large distances. Additionally, one or more elements of the host vehicle 200 may be located on a remote server (e.g., cloud-based server) and accessible via secure links.

Some of the possible elements of the host vehicle 200 are shown in FIG. 2 and will be described along with subsequent figures. However, a description of many of the elements in FIG. 2 will be provided after the discussion of FIGS. 3-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The host vehicle 200 includes one or more processor(s) 205. The processor(s) 205 are configured to implement or perform various functions described herein. In one or more arrangements, the processor(s) 205 can be a main processor of the host vehicle 200. For instance, the processor(s) 205 can be an electronic control unit (ECU). The host vehicle 200 can include memory 210 for storing one or more types of data. The memory 210 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 210 can be a component of the processor(s) 205, or the memory 210 can be operatively connected to the processor(s) 205 for use thereby. The term "operatively connected," as used throughout this description, can include direct or indirect connections, including connections without direct physical contact.

In one or more arrangements, the memory 210 can include various instructions stored thereon. In one or more arrangements, the memory 210 can store one or more modules. Modules can be computer-readable instructions that, when executed by the processor(s) 205, cause the processor(s) 205 to perform the various functions disclosed herein. While the modules will be described herein with reference to functions for purposes of brevity, it should be understood that the modules include instructions that cause the processor(s) 205 to perform the described functions. It should be noted the various modules can be remotely stored and accessible by the processor(s) 205, etc.

The host vehicle 200 can include a sensor system 215. The sensor system 215 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 215 includes a plurality of sensors, the sensors can work independently from each other. Alternatively, two or more of the sensors can work in combination with each other. In such case, the two or more sensors can form a sensor network. The sensor system 215 and/or the one or more sensors can be operatively connected to the processor(s) 205, the memory 210, and/or another element of the host vehicle 200 (including any of the elements shown in FIG. 2). The sensor system 215 can include, for example, vehicle sensors 220, external environment sensors 225, and/or internal sensors 230. As will be understood below, the sensor system 215 can be used by the processor(s) 205 to perform various functions.

The host vehicle 200 can include a communication system 235. The communication system 235 can include, for example, an antenna tuned to transmit data over a distance at a frequency. The host vehicle 200 can transmit data to one or more remote locations that are not physically connected to the host vehicle 200 using the communications system 235. The communication system 235 can be in communication with another vehicle and/or a remote database. As will be discussed in greater detail below, the surrounding vehicle marker analysis system 300 and/or the marker data transmission system 400 can use the communication system 235 to exchange data with other vehicles and/or remote databases. The communication system 235 can communicate via, for example, dedicated short range communications devices. The communication system 235 can communicate via a cellular network, Bluetooth, Wi-Fi, etc. In one or more arrangements, the communication system 235 can be, for example, a vehicle-to-vehicle communications system.

The host vehicle 200 can include a surrounding vehicle marker analysis system 300 and/or a marker data transmission system 400. These systems will be discussed with reference to FIG. 3 and FIG. 4, respectively. As a general introduction, the host vehicle 200 can detect a surrounding vehicle 100 in the external environment. The surrounding vehicle 100 can include markers 110 positioned on various surfaces of the surrounding vehicle 100. The host vehicle 200 can use the surrounding vehicle marker analysis system 300 to determine one or more attributes about the surrounding vehicle 100. This can include, for example, the orientation of the surrounding vehicle 100 and/or one or more features related to an area of the surrounding vehicle 100 located proximate a marker 110. Additionally, the surrounding vehicle 100 can transmit, using the marker data transmission system 400, data corresponding to one or more detected features related to the surrounding vehicle 100.

Figure 3:
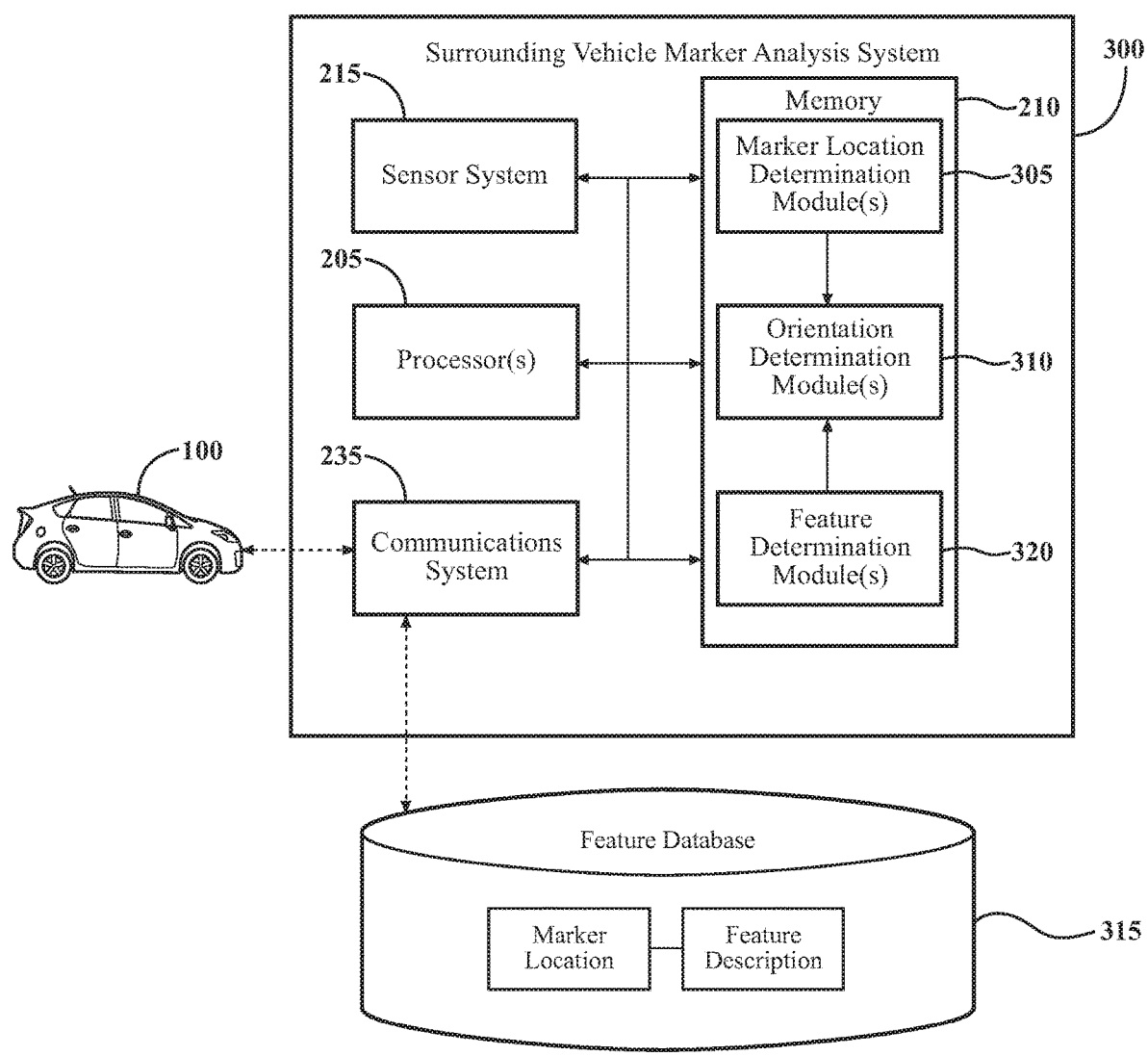
FIG. 3 illustrates a schematic view of a surrounding vehicle marker analysis system.

Referring now to FIG. 2 and FIG. 3, the surrounding vehicle marker analysis system 300 is shown. For purposes of discussion, the present description assumes that the surrounding vehicle 100 is located in the external environment of the host vehicle 200. The surrounding vehicle marker analysis system 300 can include one or more modules having instructions to analyze markers 110 positioned on the surrounding vehicle 100 located in the external environment of the host vehicle 200. The surrounding vehicle marker analysis system 300 can be in communication with the processor(s) 205, memory 210, sensor system 215 and/or the communication system 235. The one or more modules can include instructions that are executable by the processor(s) 205 to perform the functions described herein. While the surrounding vehicle marker analysis system 300 is shown including the processor(s) 205, memory 210, sensor system 215 and/or communication system 235 from the host vehicle 200, the surrounding vehicle marker analysis system 300 may include separate components from those shown in FIG. 2 for the host vehicle 200. Therefore, in some examples, the surrounding vehicle marker analysis system 300 may include its own processor(s) 205, memory 210, sensor system 215, and/or communication system 235.

The sensor system 215 can include one or more external environment sensors 225. The external environment sensors 225 can monitor the environment of the host vehicle 100 that includes the surrounding vehicle 100. In one or more arrangements, the external environment sensors 225 can detect the surrounding vehicle 100, and detect one or more markers 110 on the surrounding vehicle 100. The external environment sensors 225 can include one or more cameras 240. In one or more arrangements, the one or more cameras 240 can be high dynamic range (HDR) cameras or infrared (IR) cameras. In one or more arrangements, the one or more cameras 240 can be a hyperspectral camera capable of detecting light outside the visible light spectrum. In this example, the markers 110 positioned on the surrounding vehicle 100 can non-visible markers as previously explained, and the one or more cameras 240 can be configured to detect the light outside the visible light spectrum that is reflected from the non-visible markers 110.

The surrounding vehicle marker analysis system 300 can include a marker location determination module 305. The marker location determination module 305 can receive data from the sensor system 215 corresponding to the external environment of the host vehicle 200. The surrounding vehicle 100 can be located in the external environment of the host vehicle 200. The camera(s) 240 can capture an image of the external environment of the host vehicle 200 including the surrounding vehicle 100. The processor(s) 205 can receive the image from the camera(s) 240. The marker location determination module 305 can be configured to process the image. The marker location determination module 305 can detect, via the image captured by the camera(s) 240 and resulting image processing, one or more of the markers 110 positioned on the surrounding vehicle 100. The marker location determination module 305 can detect the location of the markers 110 positioned on the surrounding vehicle 100. The marker location determination module 305 can decode data encoded in the markers 110 and thereby extract the data for the markers 110. The marker location determination module 305 can determine the location of the markers 110 on the surrounding vehicle 100 based on the extracted data for the markers 110. In one or more arrangements, the marker location determination module 305 can create a model (shown in FIG. 5) for the surrounding vehicle 100 based on the location of the markers 110. The model for the surrounding vehicle 100 can include the markers 110 that the surrounding vehicle marker analysis system 300 "observes", as compared to the markers 110 that remain out of the field of view for the host vehicle 100.

The surrounding vehicle marker analysis system 300 can include an orientation determination module 310. The orientation determination module 310 can receive the location of the detected markers 110 positioned on the surrounding vehicle 100. The orientation determination module 310 can determine an orientation of the surrounding vehicle 100 based on which of the markers 110 were detected.

Figure 5:
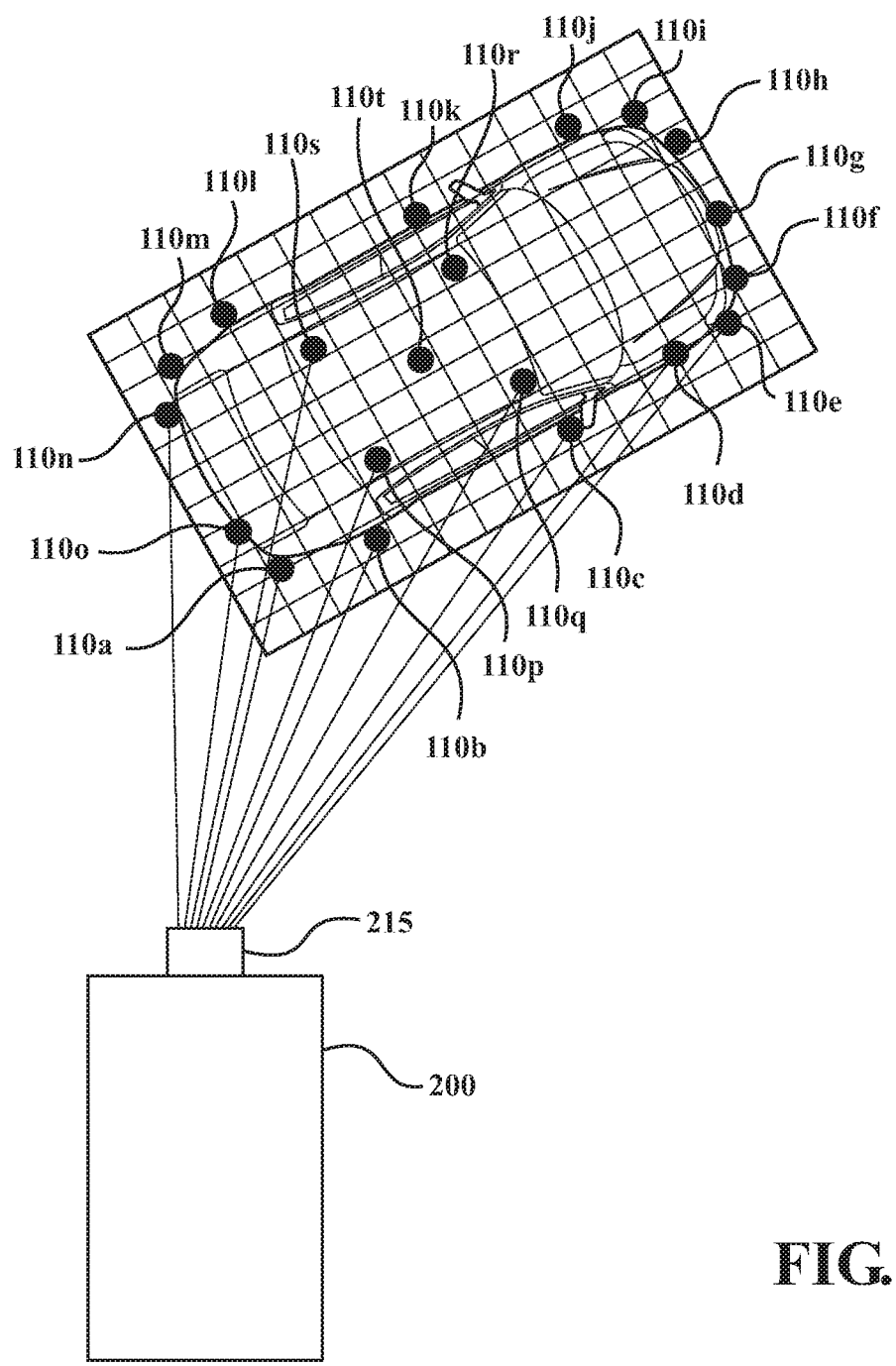
FIG. 5 illustrates an example model constructed by the host vehicle.

Referring to FIG. 3 and FIG. 5, the orientation determination module 310 can include instructions for constructing a model, similar to that shown in FIG. 5, of the surrounding vehicle 100 based on the detected markers 110. In one or more arrangements, the model can be constructed based in part on the location of the markers 110 that were detected as opposed to the markers 110 that were not detected. In the example shown in FIG. 5, the host vehicle 200 detects, using the sensor system 215, markers 110a-110e, markers 110n-110o, markers 110p-100q, and marker 110s. The orientation determination module 310 can map the detected markers 110a-e, 110n-o, 110p-q, and 110s using the data corresponding to the location of each respective marker 110. The orientation determination module 310 can determine the orientation of the surrounding vehicle 100 based on this generated model.

Returning to FIG. 2 and FIG. 3, the surrounding vehicle marker analysis system 300 can in some examples access a feature database 315. The surrounding vehicle marker analysis system 300 can access the feature database 315 using the communications system 235. The feature database 315 can be any type of data store or memory that is configured to store information. It should be noted that the following description assumes that one or more features corresponding to the surrounding vehicle 100 are already stored on the feature database 315. As will be described in greater detail with reference to FIG. 4, the feature database 315 can be updated with data (and/or data can be uploaded) corresponding to one or more detected features in an area of the surrounding vehicle 100 located proximate a marker 110. As such, the feature database can include data identifying a particular marker 110 for the surrounding vehicle 100 and data corresponding to the feature for the area of the surrounding vehicle 100 located proximate the particular marker 110.

In one or more arrangements, the surrounding vehicle marker analysis system 300 can include a feature determination module 320. The surrounding vehicle marker analysis system 300 can use the feature determination module 320 to determine one or more features corresponding to a detected marker 110. The surrounding vehicle marker analysis system 300 can use the communication system 235 to access the feature database 315. In one or more arrangements, the surrounding vehicle marker analysis system 300 can receive data for the one or more features directly from the surrounding vehicle 100. The surrounding vehicle marker analysis system 300 can receive data from the surrounding vehicle 100 using the communications system 235. In this example, the communication system 235 can be configured for inter-vehicle communications, such as a vehicle-to-vehicle (V2V) communications system.

Based on the data received from the feature database 315 and/or directly from the surrounding vehicle 100, the feature determination module 320 can determine one or more features related to an area of the surrounding vehicle 100 located proximate a respective marker. For example, the host vehicle 200 can detect the marker 110d positioned on the fuel door 130 of the surrounding vehicle 100. The feature database 315 can include data indicating a feature corresponding to that marker 110d. The feature database 315 can also include data indicating which vehicle the feature is associated with. In this example, the feature corresponding to the marker 110d positioned on the fuel door 130 can be a current fuel level. The host vehicle 200 can access the feature database 315 and look up any features associated with the surrounding vehicle 100 (by looking up the data that indicates which vehicle the features are associated with). The host vehicle 200 can determine that there is data associated with marker 110d for the surrounding vehicle 100. The host vehicle 200 can then determine the feature (e.g., the fuel level) associated with the area of the surrounding vehicle 100 located proximate the marker 110d (e.g., the fuel tank). As will be discussed in greater detail below, the feature database 315 can be updated by the surrounding vehicle 100 to reflect current dynamic conditions in the surrounding vehicle 100.

In one or more arrangements, the feature determination module 320 can associate features with the model of the surrounding vehicle 100 generated using the instructions from the orientation determination module 310. In this example, the model can include orientation data as well as one or more features associated with various areas of the surrounding vehicle 100 located proximate the detected markers 110. As will be seen, the model generated using the instructions on the orientation determination module 310 (and optionally updated using the instructions on the feature determination module 320) can be used for path planning for the host vehicle 200, among other uses.

Figure 6:
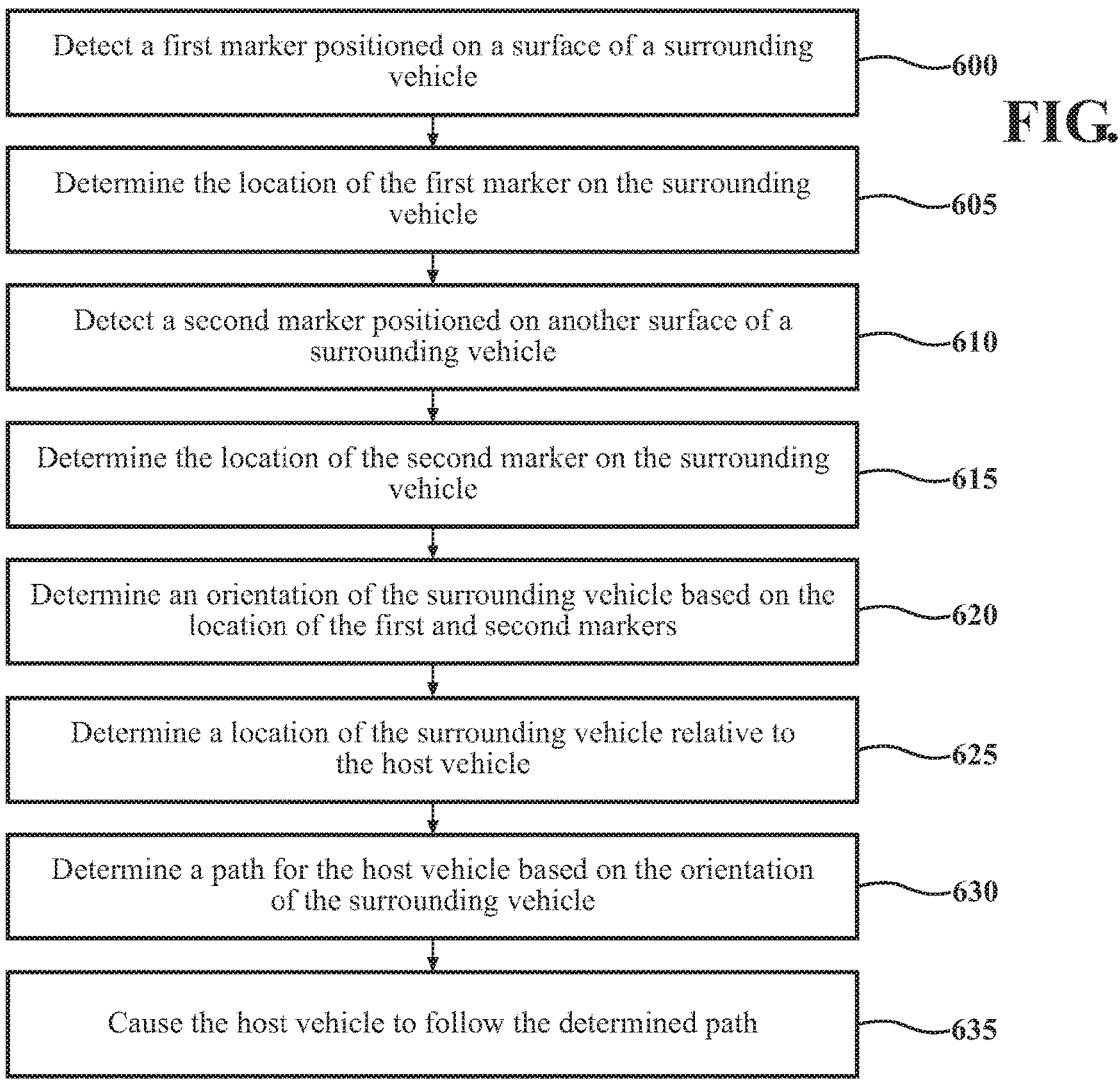
FIG. 6 illustrates a method of operating the host vehicle on a roadway.

Now that the surrounding vehicle marker analysis system 300 has been described, a method of operating the host vehicle on a roadway will be described with reference to FIG. 6. The flowchart shown in FIG. 6 provides only one example of operating the host vehicle. The following disclosure should not be limited to each and every function block shown in FIG. 6. To the contrary, the method does not require each and every function block shown. In some examples, the method may include additional function blocks. Further, the method does not need to be performed in the same chronological order shown in FIG. 6.

As shown in the exemplary flow chart depicted in FIG. 6, the method can begin at function block 600.

At function block 600, the processor(s) 205 can detect, using instructions from the marker location determination module 305, a first marker 110 positioned on a surface of the surrounding vehicle 100. In one or more arrangements, processor(s) 205 can detect the first marker 110 using the camera 240 from the sensor system 215. In arrangements where the first marker 110 is a non-visible marker, the camera 240 can be a hyperspectral camera. The first marker 110 can be any marker 110 positioned on any surface of the surrounding vehicle 100. As stated above, the first marker 110 can include data corresponding to the location of the first marker 110. In one or more arrangements, the data can indicate the relative location of the first marker 110 on a vehicle grid 138 for the surrounding vehicle 100. In another example, the first marker 110 can include data that identifies the surface that it is positioned on. The data can include, for example, machine-readable text or code that states the ordinary name of the surface that the first marker 110 is positioned on. The method can continue to function block 605.

At function block 605, the processor(s) 205 can determine, via the instructions from the marker location determination module 305, the location of the first marker 110 on the surrounding vehicle 100. In one or more arrangements, the processor(s) 205 can determine the location of the first marker 110 by analyzing the image captured by the camera 240, the image including the surrounding vehicle 100 having the first marker 110. In one or more arrangements, processor(s) 205 can analyze the image to determine the location of the first marker 110 on the surrounding vehicle 100. The processor(s) 205 can decode the data encoded in the first marker 110 to determine the location of the first marker 110 on the surrounding vehicle 100. In one or more arrangements, the processor(s) 205 can create a model, using instructions from the orientation determination module 310, for the surrounding vehicle 100 based on the location of the first marker 110. The method can continue to function block 610.

At function block 610, the processor(s) 205 can detect, via the instructions included on the marker location determination module 305, a second marker 110 positioned on another surface of the surrounding vehicle 100. In one or more arrangements, the processor(s) 205 can detect the second marker 110 using the camera 240 from the sensor system 215. In arrangements where the second marker 110 is a non-visible marker, the camera 240 can be a hyperspectral camera. The second marker 110 can be any marker 110 positioned on any surface of the surrounding vehicle 100, other than the first marker 110 detected at function block 600. As stated above, the second marker 110 can include data corresponding to the location of the second marker 110. In one or more arrangements, the data can indicate the relative location of the second marker 110 on a vehicle grid 138 for the surrounding vehicle 100. In another example, the second marker 110 can include data that identifies the surface that it is positioned on. The data can include, for example, machine-readable text or code that states the ordinary name of the surface that the second marker 110 is positioned on. The method can continue to function block 615.

At function block 615, the processor(s) 205 can determine, using the instructions included on the marker location determination module 305, the location of the second marker 110 on the surrounding vehicle 100. In one or more arrangements, the processor(s) 205 can determine the location of the second marker 110 by analyzing the image captured by the camera 240, the image including the surrounding vehicle 100 having the second marker 110. In one or more arrangements, the processor(s) 205 can analyze the image to determine the location of the second marker 110 on the surrounding vehicle 100. The processor(s) 205 can decode the data encoded in the second marker 110 to determine the location of the second marker 110 on the surrounding vehicle 100. In one or more arrangements, the processor(s) 205 can update the model for the surrounding vehicle 100 based on the location of the second marker 110. The method can continue to function block 620.

At function block 620, the processor(s) 205 can determine, using instructions from the orientation determination module 310, an orientation of the surrounding vehicle 100. The processor(s) 205 can determine the orientation of the surrounding vehicle 100 based on the location of the first and second markers 110. The processor(s) 205 can determine the orientation of the surrounding vehicle 100 based on a comparison the markers 110 that were detected (e.g., the first and second markers 110) to the markers 110 that were not detected (e.g., the third through N-th markers 110). In one or more arrangements, the processor(s) 205 can determine the orientation of the surrounding vehicle 100 based on the model for the surrounding vehicle 100. The method can continue to function block 625.

At function block 625, the processor(s) 205 can determine the location of the surrounding vehicle 100 relative to the host vehicle 200. In one or more arrangements, the processor(s) 205 can determine the location of the surrounding vehicle relative to the host vehicle 200 by determining which sensor in the sensor system 215 detected the surrounding vehicle 100. The processor(s) 205 can also determine a direction that the sensor is "observing". In this regard, the processor(s) 205 determine a course relative location (e.g., a general relative location). In one or more arrangements, the processor(s) 205 can receive an absolute location (e.g., GPS coordinates, latitude/longitude, etc.) from the surrounding vehicle 100 via, for example, the communication system 235. The processor(s) 205 can determine the current location of the host vehicle 200 using, for example, the current GPS coordinates from the global positioning system 122. The processor(s) 205 can determine the relative location of the surrounding vehicle 100 by comparing the absolute location of the surrounding vehicle 100 with the current location of the host vehicle 200. In one or more arrangements, the host vehicle 200 can detect, using one or more sensors in the sensor system 215 a distance between the surrounding vehicle 100 and host vehicle 200. From this distance, the processor(s) 205 can detect the location of the surrounding vehicle 100 relative to the host vehicle 200. The method can continue to function block 630.

At function block 630, the processor(s) 205 can determine, using instructions from the autonomous driving module 160, a path for the host vehicle 200 based on, at least, the orientation of the surrounding vehicle 100. In one or more arrangements, the processor(s) 205 can determine the path based on, at least, the orientation and location of the surrounding vehicle 100 relative to the host vehicle 200. The determined path can be a path that avoids a collision with the surrounding vehicle 100.

In one or more arrangements, the processor(s) 205 can determine a likelihood of collision with the surrounding vehicle 100. As will be discussed in greater detail below, the likelihood of a collision with the surrounding vehicle 100 can be based on the current path of the host vehicle 200, the location and orientation of the surrounding vehicle 100, and/or the ability of the host vehicle 200 to modify the current path. The ability of the host vehicle 200 to modify the current path can be based on the distance between the host vehicle 200 and surrounding vehicle 100, the turn radius capabilities of the host vehicle 200, the trajectory and speed of the surrounding vehicle 100, the speed of the host vehicle 200, etc. The likelihood of a collision with the surrounding vehicle 100 can be, for example, a percentage chance of a collision. In one or more arrangements, the path determined by the host vehicle 200 can be a collision path responsive to the likelihood of collision being sufficiently high. Sufficiently high can include, for example, greater than or equal to a 50% chance of collision, 60% chance of collision, 70% chance of collision, etc. In one or more arrangements, the determined collision path can be based on at least one feature for the surrounding vehicle 100. In some examples, the at least one feature may include any one of a fuel level of the surrounding vehicle 100, a hazardous cargo assessment for the area of the surrounding vehicle 100 proximate the location of each respective marker 110, an occupant presence state indicating a presence of any occupants in the area of the surrounding vehicle 100 proximate the location of each respective marker 110, and an occupant vulnerability assessment for any occupants located in the area of the surrounding vehicle 100 proximate the location of each respective marker 110.

The processor(s) 205 can receive, either directly or indirectly from the surrounding vehicle 100, data related to these features. In one or more arrangements, the data related to these features can be associated with one of the detected markers 110 on the surrounding vehicle 100. In this regard, the features can be associated with an area of the surrounding vehicle 100 proximate a respective marker 110. The data related to these features can be generated by the surrounding vehicle 100 and received by the host vehicle 200.

The processor(s) 205 can determine, using instructions from the autonomous driving module 160, the path for the host vehicle 200 based on, at least, the determined orientation for the surrounding vehicle 100. In one or more arrangements, the processor(s) 205 can determine the path for the host vehicle 200 based on the orientation and location of the surrounding vehicle 100. In some instances, where the processor(s) 205 determine a likely collision with the surrounding vehicle 100, the processor(s) 205 can determine a collision path for the host vehicle 200 based on the orientation, location, and/or one or more features associated with the surrounding vehicle 100.

At function block 635, the processor(s) 205 can control, using instructions from the autonomous driving module 160, the host vehicle 200 so as to cause the host vehicle 200 to follow the determined path. As will be discussed in greater detail below, the processor(s) 205 can control the host vehicle 200 so as to cause the host vehicle 200 to follow the determined path using instructions stored on the autonomous driving module 160. The processor(s) 205 can send one or more control signals to one or more actuators 150 to control one or more vehicle systems 140, which will in turn cause the host vehicle 200 to follow the determined path. This will be discussed in greater detail below.

Figure 4:
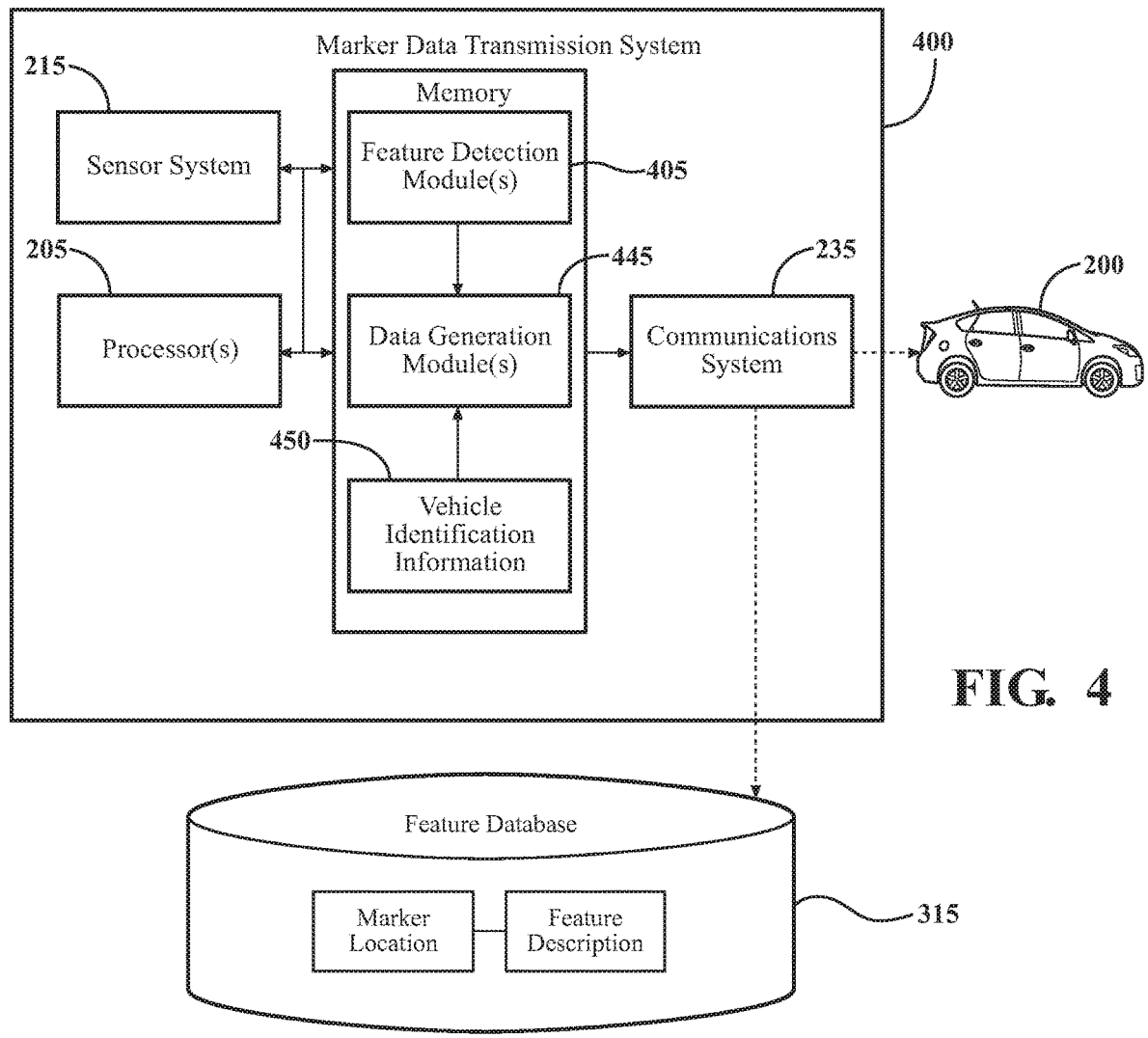
FIG. 4 illustrates a schematic view of a marker data transmission system.

Referring now to FIG. 2 and FIG. 4, the marker data transmission system 400 will be described. It should be noted that the following description assumes that the surrounding vehicle 100 includes many of the same components as the host vehicle 200. As such, the surrounding vehicle 100 will be described with reference to FIG. 2 for consistency and clarity purposes. However, as stated above, it should be understood that the surrounding vehicle 100 does not require all the elements of the host vehicle 200. In some instances, the host vehicle 200 may only determine the orientation of the surrounding vehicle 100. However, in other instances, it may be desirable to receive additional information about the surrounding vehicle 100. In these instances, the surrounding vehicle 100 may include the marker data transmission system 400 and components associated therewith.

The marker data transmission system 400 can be in communication with the sensor system 215. The sensor system can include the vehicle sensors 220 and/or the internal sensors 230. The vehicle sensors 220 and/or the internal sensors 230 can be configured to monitor one or more areas of the surrounding vehicle 100. In one or more arrangements, vehicle sensors 220 and/or the internal sensors 230 can include one or more sensors configured to monitor the fuel tanks 410, the battery 415, a cargo space 420, the cabin, etc. The vehicle sensors 220 can include fuel sensor(s) 425 and/or charge sensors 430 the energy level in the fuel tanks 410 and/or the battery 415, respectively. The sensor system 215 can also include one or more internal sensors 230 to monitor, for example, the cargo space 420 and/or the cabin.

In one or more arrangements, the internal sensors 230 can include a cargo monitoring sensors 435. The cargo monitoring sensors 435 can include one or more sensors for monitoring the cargo space 420. The processor(s) 205 can determine, based on data from the cargo monitoring sensors 435, a cargo risk assessment for the area of the surrounding vehicle 100 proximate the location of each respective marker 110. In this example, the surrounding vehicle 100 can include one or more markers 110 positioned on a trunk, on the cargo space, etc. The cargo risk assessment can be for the cargo area (e.g., trunk, cargo space, etc.), which is located proximate a marker 110 corresponding to the trunk, cargo space, etc. The cargo risk assessment can be based on any cargo present in the area of the surrounding vehicle 100 proximate the location of marker 110 corresponding to the trunk, cargo space, etc. In one or more arrangements, the cargo monitoring sensors 435 can be, for example, hazardous material detection sensors, radioactive detection sensors, etc.

The cargo monitoring sensors 435 can also be, for example, cameras configured to capture an image of the area of the surrounding vehicle 100 proximate the location of a respective marker 110 (e.g., the trunk, cargo space, etc.). In this example, the processor(s) 205 can process an image captured by the cargo monitoring sensors 435 to detect cargo in the cargo space 420.

The processor(s) 205 can also detect, using the cargo monitoring sensors 435, instances where the surrounding vehicle 100 is carrying or transporting cargo in the cargo space 420 that, should the surrounding vehicle 100 be in an accident, it would be expensive, difficult, and/or impractical to replace or regather. The processor(s) 205 can detect these instances using the cargo monitoring sensors 435 to determine that an area of the surrounding vehicle 100 proximate the marker 110 is fully stocked and/or packed. Additionally or alternatively, an operator can input a cargo assessment into a user interface, the cargo assessment corresponding to the type of cargo being transported by the surrounding vehicle 100. To provide an example, the operator can input the type of cargo they are transporting (e.g., food or beverages, electronics, kitchenware, hazardous material, etc.). Each of these types of cargo can include a cargo risk assessment associated therewith. The cargo risk assessment can correspond to the risk of damage to, for example, the cargo, environment, etc. should a collision with the surrounding vehicle 100 occur.

While these examples of determining the cargo risk assessment for cargo being transported are disclosed, it should be understood that the risk of damage to the environment, cargo, etc. can be determined many different ways. Therefore, the present disclosure should not be limited to the examples described herein.

The internal sensors 230 can additionally or alternatively include occupant detection sensor(s) 440. The occupant detection sensor(s) 440 can be configured to detect an occupant presence state. The occupant presence state can indicate the presence of an occupant in the cabin of the surrounding vehicle 100. In one or more arrangements, the processor(s) 205 can determine, using the occupant detection sensor(s) 440, the location of the occupant within the cabin of the surrounding vehicle 100 (e.g., driver, passenger front seat, driver's side back seat, passenger-side back seat, etc.). The occupant detection sensors 440 can include one or more sensors for detecting the presence and/or location of the occupants of the surrounding vehicle 100. The one or more sensors can include, for example, eye/face sensors, cameras, infrared detection systems, seat belt monitoring systems, weight sensors in seats, etc.

In one or more arrangements, the occupant detection sensors 440 can further be configured detect a vulnerability of any occupants present in the cabin of the surrounding vehicle 100. In one or more arrangements, the processor(s) 205 can determine, using the occupant detection sensors 440, an age of any of the occupants present in the cabin, for example. In this example, the occupant detection sensors 440 can be one or more internal cameras, and the processor(s) can determine the age of any occupants by processing images captured by the internal camera(s). Additionally or alternatively, the occupant detection sensors 440 can detect a weight of any occupants present in the cabin. The occupant detection sensors 440 be weight sensors positioned in seats for detecting the weight of the occupants seated in the respective seats. In one or more arrangements, the processor(s) 205 can determine, using the occupant detection sensors 440, whether or not the occupants present in the surrounding vehicle 100 are wearing their seat belts. In this example, the occupant detection sensor(s) 440 can include seat belt monitoring sensors. In one or more arrangements, the processor(s) 205 can determine, using the occupant detection sensor(s) 440, whether there are any car seats in the cabin. The occupant detection sensors 440 can include, for example, the internal camera(s), and the processor(s) 205 can determine whether there are any car seats in the cabin by processing images captured by the internal camera(s). Based on data captured from the occupant detection sensor(s) 440, the processor(s) 205 can determine the vulnerability of any occupants present in the cabin of the surrounding vehicle 100. For example, children and elder occupants are typically more vulnerable in collisions than middle-aged occupants, occupants who are not wearing seatbelts are typically more vulnerable in collisions than occupants who are wearing their seatbelts, etc.

In one or more arrangements, the marker data transmission system 400 can include a feature detection module 405. The feature detection module 405 can receive data from the vehicle sensors 220 and/or the internal sensors 230. The data can correspond to the area of the surrounding vehicle 100 that the vehicle sensors 220 and/or internal sensors 230 are monitoring (e.g., fuel tank 410, battery 415, cargo space 420, cabin including one or more occupants, etc.). The feature detection module 405 can be configured to determine the location of area that the vehicle sensors 220 and/or internal sensors 230 are monitoring. For example, the feature detection module 405 can include data corresponding to the area that each sensor in the sensor system 215 is monitoring. Responsive to receiving data from any sensor in the sensor system 215, the feature detection module 405 can be configured to associate data received from one or more sensor(s) in the sensor system 215 with a particular area of the surrounding vehicle 100 that the one or more sensor(s) are monitoring. In one or more arrangements, the feature detection module 405 can also include data corresponding to the location of any markers 110 positioned on various external surfaces of the surrounding vehicle 100. In one or more arrangements, the location of one or more markers 110 may coincide with the location of areas monitored by one or more sensors in the sensor system 215. In this regard, one or more sensors of the sensor system 215 may monitor an area of the surrounding vehicle 100 proximate the location of a marker 110 on the surrounding vehicle 100.

In one or more arrangements, the marker data transmission system 400 can include a data generation module 445. The data generation module 445 can include instructions for generating data corresponding to the detected features. The instructions stored on the data generation module 445 can be used to generate data according to outputs from the instructions included in other various modules of the surrounding vehicle 100. The data generated using the instructions from the data generation module 445 can correspond to the one or more detected features for the surrounding vehicle 100. In one or more arrangements, the feature detection module 405 can be configured to identify any markers 110 located proximate the area of the surrounding vehicle 100 corresponding to the data for the detected one or more features. In this regard, the data generated using the instructions from the data generation module 445 can include the identification of the markers 110 corresponding to the detected one or more features. For example, where the detected feature corresponds to an occupant being present in the driver's side backseat, the data generated using the instructions from the data generation module 445 can include data for this feature as well as an identification of marker 110*c*.

In one or more arrangements, the data generated using the instructions from the data generation module 445 can include vehicle identification information 450. The vehicle identification information 450 can be stored on memory 210, for example. The vehicle identification information 450 can include any information that enables specific identification of the surrounding vehicle 100. In one or more arrangements, the vehicle identification information 450 can include a VIN number, a license plate number, a unique pin associated with the surrounding vehicle 100, etc.

The instructions stored on the data generation module 445 can be used to generate data corresponding to the detected feature(s). The generated data can include, for example, the identification information for the surrounding vehicle 100, the location of the marker 110 associated with the detected feature(s), and data corresponding with the detected feature(s). In one or more arrangements, the data corresponding with the detected feature(s) can be generally described as metadata for a particular marker 110. It should be noted that, while described as generating data for detected features for the surrounding vehicle 100, the data generation module 445 can also update and/or revise data as features of the surrounding vehicle 100 change over time. The data generation module 445 can update the data as changes to the features are detected, at constant intervals (e.g., every one minute, five minutes, 10 minutes, hour, etc.), only while the surrounding vehicle 100 is being driven, only when features for the surrounding vehicle 100 change, etc.

The data generation module 445 can include instructions for communicating the generated data to the communications system 235. The data can be communicated to the communications system 235 responsive to the data being considered complete (e.g., ready for transmission to one or more remote sources). In one or more arrangements, the processor(s) 205 can communicate, using the communications system 235, the generated data directly to another vehicle (e.g., the host vehicle 200). In this example, the processor(s) 205 can communicate the generated data to another vehicle using a vehicle-to-vehicle communications system.

In one or more arrangements, the processor(s) 205 can communicate, using the communications system 235, the generated data to the feature database 315 which is accessible by another vehicle (e.g., the host vehicle 200). In this example, the feature database 315 can include vehicle identification information for a plurality of vehicles (including the surrounding vehicle 100), data identifying specific markers for each of the plurality of vehicles, and data corresponding to one or more features for any one of the specific markers. In one or more arrangements, the processor(s) 205 can update, using the communications system 235, data already stored on the feature database 315, the update corresponding to the data generated using instructions stored on the data generation module 445.

Figure 7:
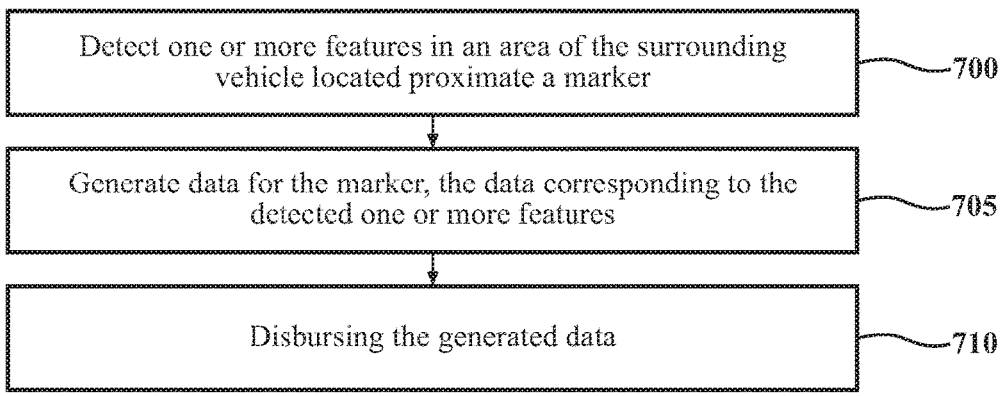
FIG. 7 illustrates a method for providing information related to one or more features of the surrounding vehicle.

Now that the marker data transmission system 400 has been described, a method for providing information related to one or more features of the surrounding vehicle 100 will be described with reference to FIG. 7. The flowchart shown in FIG. 7 is only for exemplary purposes. The following disclosure should not be limited to each and every function block shown in FIG. 7. To the contrary, the method does not require each and every function block shown. In some examples, the method may include additional function blocks. Further, the method does not need to be performed in the same chronological order shown in FIG. 7.

As shown in the exemplary flow chart depicted in FIG. 7, the method can begin at function block 700.

At function block 700, the processor(s) 205 can detect, using instructions from the feature detection module 405, one or more features for the surrounding vehicle 100. In one or more arrangements, the one or more detected features can correspond to an area of the surrounding vehicle 100 proximate the location of a marker 110. In one or more arrangements, the marker 110 can be positioned on a fuel door 130. In one or more arrangements, the marker 110 can be positioned on an occupant door 120, 125. In one or more arrangements, the marker 110 can be positioned on the outside of a cargo area of the surrounding vehicle 100. The processor(s) 205 can detect the one or more features for the surrounding vehicle 100 using data captured by the sensor system 215. The method can continue to function block 705.

At function block 705, the processor(s) 205 can generate, using instructions from the data generation module 445, data for the detected one or more features. In one or more arrangements, the data generated in function block 705 can represent the detected one or more features from function block 705. The processor(s) 205 can generate data for the marker 110 located proximate to an area of the surrounding vehicle 100 corresponding to the detected one or more features. The one or more detected features can include, for example, a fuel level, a cargo risk assessment, an occupant presence state indicating the presence of one or more occupants in the cabin of the surrounding vehicle 100 located proximate the marker 110, a vulnerability of any of the occupants present in the cabin of the surrounding vehicle 100, etc. In one or more arrangements, the generated data can include vehicle identification data for the surrounding vehicle 100, marker identification data for the marker 110 associated with the detected one or more feature(s), and/or data corresponding to the detected one or more feature(s). As stated, the vehicle identification information 450 can, in some arrangements, be stored on memory 210. The method can continue to function block 710.

At function block 710, the processor(s) 205 can transmit, using the communications system 235 the data generated at function block 705. In one or more arrangements, the data can be disbursed, via a vehicle-to-vehicle communications system, to another vehicle. In one or more arrangements, the data can be disbursed to the feature database 315. The feature database 315 can be accessible by another vehicle.

Figure 8:
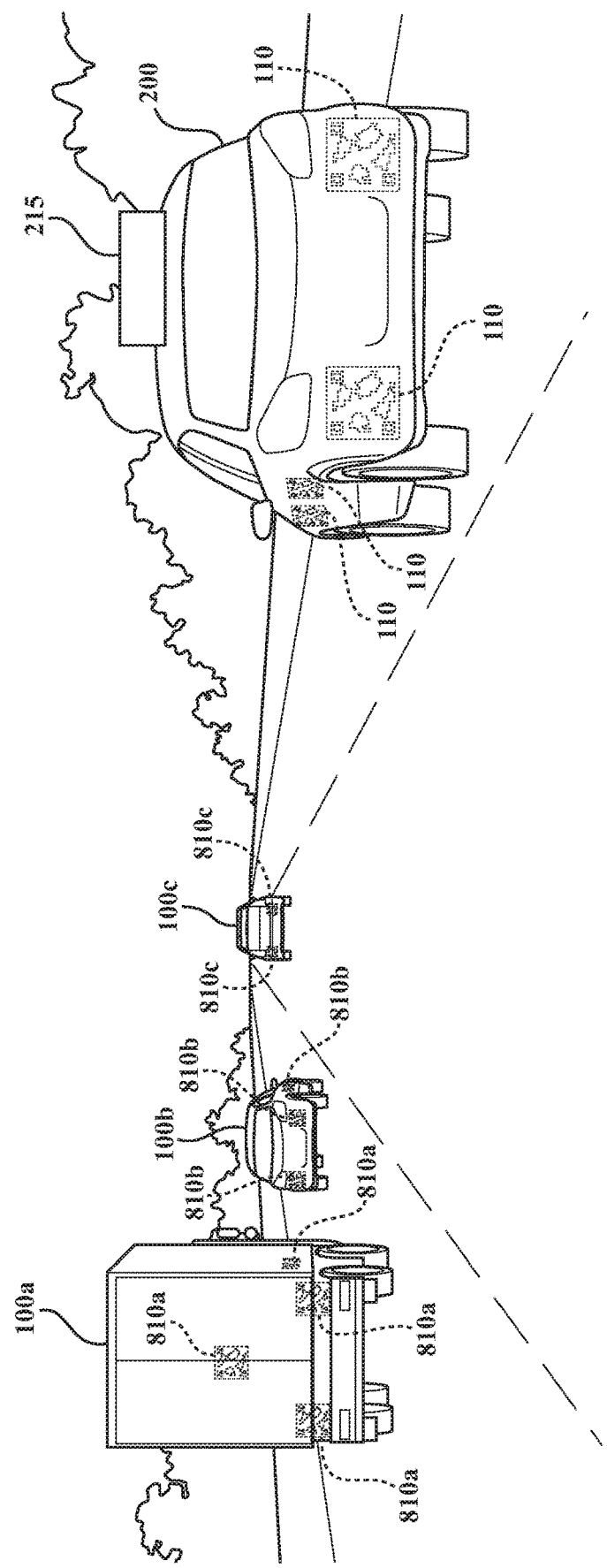
FIG. 8 illustrates an example of a host vehicle on a roadway including a plurality of surrounding vehicles.

Referring now to FIG. 8, an example of the host vehicle 200 on a roadway including a plurality of surrounding vehicles is shown. As shown in FIG. 8, the host vehicle 200 can in some instances include markers 110.

In the example shown in FIG. 8, there are three surrounding vehicles 100a, 100b, 100c located in the external environment of the host vehicle 200. The host vehicle 200 can detect, using the sensor system 215, markers 800 positioned on each of the surrounding vehicles 100a, 100b, 100c. The host vehicle 200 can detect markers 800a positioned on the first surrounding vehicle 100a, markers 800b positioned on the second surrounding vehicle 100b, and markers 800c positioned on the third surrounding vehicle 100c.

The host vehicle 200 can determine, using the surrounding vehicle marker analysis system 300, the location of each of the detected markers 800a-800c on each of the detected surrounding vehicles 100a-100c. The host vehicle 200 can determine the orientation of each of the surrounding vehicles 100a-100c based on the determined location of their respective markers 800a-800c. The host vehicle 200 can also determine the location of each surrounding vehicle 100a-100c relative to the host vehicle 200.

The host vehicle 200 can also determine, using the surrounding vehicle marker analysis system 300, any features for the surrounding vehicles 100a-100c. The features for the surrounding vehicles 100a-100c can be for areas of the surrounding vehicles 100a-100c located proximate any of their respective markers 800a-800c. The host vehicle 200 can determine the features based on data generated by the surrounding vehicles 100a-100c. In one or more arrangements, the surrounding vehicles 100a-100c can send, via a vehicle-to-vehicle communications system, generated data to the host vehicle 200. In one or more arrangements, the surrounding vehicles 100a-100c can send the generated data to the feature database 315, which is accessible by the host vehicle 200.

The host vehicle 200 can determine a path for the host vehicle 200 based on, at least, the orientation of the surrounding vehicles 100a-100c. In one or more arrangements, the host vehicle 200 can determine the path for the host vehicle 200 based on the orientation and relative location of the surrounding vehicles 100a-100c. In one or more arrangements, the host vehicle can also determine the path for the host vehicle 200 based on any determined features for the surrounding vehicles 100a-100c. Responsive to determining the path for the host vehicle 200, the host vehicle 200 can follow the determined path.

FIG. 2 will now be discussed in full detail as an example environment within which the system and methods disclosed herein may operate. In some instances, the host vehicle 200 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the host vehicle 200 can be a conventional vehicle that is configured to operate in only a manual mode.

In one or more embodiments, the host vehicle 200 is an autonomous vehicle. As used herein, "autonomous vehicle" refers to a vehicle that operates in an autonomous mode. "Autonomous mode" refers to navigating and/or maneuvering the host vehicle 200 along a travel route using one or more computing systems to control the host vehicle 200 with minimal or no input from a human driver. In one or more embodiments, the host vehicle 200 is highly automated or completely automated. In one embodiment, the host vehicle 200 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the host vehicle 200 along a path. In one or more arrangements, the path can be the path determined for the host vehicle 200 as described in function block 630 of FIG. 6.

In one or more arrangements, the memory 210 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The memory 210 can include sensor data 119. In this context, "sensor data" means any information about the sensors that the host vehicle 200 is equipped with, including the capabilities and other information about such sensors. As will be explained below, the host vehicle 200 can include the sensor system 215. The sensor data 119 can relate to one or more sensors of the sensor system 215. As an example, in one or more arrangements, the sensor data 119 can include information on one or more LIDAR sensors 124 of the sensor system 215.

In some instances, at least a portion of the map data 116 and/or the sensor data 119 can be located in memory 210 located onboard the host vehicle 200. Alternatively, or in addition, at least a portion of the map data 116 and/or the sensor data 119 can be located in memory 210 that is located remotely from the host vehicle 200.

As noted above, the host vehicle 200 can include the sensor system 215. The sensor system 215 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 215 includes a plurality of sensors, the sensors can work independently from each other. Alternatively, two or more of the sensors can work in combination with each other. In such case, the two or more sensors can form a sensor network. The sensor system 215 and/or the one or more sensors can be operatively connected to the processor(s) 205, the memory 210, and/or another element of the host vehicle 200 (including any of the elements shown in FIG. 2). The sensor system 215 can acquire data of at least a portion of the external environment of the host vehicle 200 (e.g., the present context).

The sensor system 215 can include any suitable type of sensor. Various examples of different types of sensors will be described herein. However, it will be understood that the embodiments are not limited to the particular sensors described. The sensor system 215 can include one or more vehicle sensors 121. The vehicle sensor(s) 121 can detect, determine, and/or sense information about the host vehicle 200 itself. In one or more arrangements, the vehicle sensor(s) 121 can be configured to detect, and/or sense position and orientation changes of the host vehicle 200, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS) 122, a navigation system 147, and/or other suitable sensors. The vehicle sensor(s) 121 can be configured to detect, and/or sense one or more characteristics of the host vehicle 200. In one or more arrangements, the vehicle sensor(s) 121 can include a speedometer to determine a current speed of the host vehicle 200.

Alternatively, or in addition, the sensor system 215 can include one or more external environment sensors 225 configured to acquire, and/or sense driving environment data. "Driving environment data" includes and data or information about the external environment in which an autonomous vehicle is located or one or more portions thereof. For example, the one or more external environment sensors 225 can be configured to detect, quantify and/or sense obstacles in at least a portion of the external environment of the host vehicle 200 and/or information/data about such obstacles. Such obstacles may be stationary objects and/or dynamic objects. The one or more external environment sensors 225 can be configured to detect, measure, quantify and/or sense other things in the external environment of the host vehicle 200, such as, for example, lane markers, signs, traffic lights, traffic signs, lane lines, crosswalks, curbs proximate the host vehicle 200, off-road objects, etc.

Various examples of sensors of the sensor system 215 will be described herein. The example sensors may be part of the one or more external environment sensors 225 and/or the one or more vehicle sensors 121. However, it will be understood that the embodiments are not limited to the particular sensors described.

As an example, in one or more arrangements, the sensor system 215 can include one or more radar sensors 123, one or more LIDAR sensors 124, one or more sonar sensors, and/or one or more cameras 240. In one or more arrangements, the one or more cameras 240 can be high dynamic range (HDR) cameras or infrared (IR) cameras. In one or more arrangements, the one or more cameras 240 can be hyperspectral cameras.

The host vehicle 200 can include an input system 165. An "input system" includes any device, component, system, element or arrangement or groups thereof that enable information/data to be entered into a machine. The input system 165 can receive an input from a vehicle passenger (e.g. a driver or a passenger). The host vehicle 200 can include an output system 170. An "output system" includes any device, component, or arrangement or groups thereof that enable information/data to be presented to a vehicle passenger (e.g. a person, a vehicle passenger, etc.).

The host vehicle 200 can include one or more vehicle systems 140. Various examples of the one or more vehicle systems 140 are shown in FIG. 2. However, the host vehicle 200 can include more, fewer, or different vehicle systems. It should be appreciated that although particular vehicle systems are separately defined, each or any of the systems or portions thereof may be otherwise combined or segregated via hardware and/or software within the host vehicle 200. The host vehicle 200 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the host vehicle 200 and/or to determine a travel route for the host vehicle 200. The navigation system 147 can include one or more mapping applications to determine a path for the host vehicle 200. The navigation system 147 can include a global positioning system, a local positioning system or a geolocation system.

The host vehicle 200 can include an autonomous driving module(s) 160. The autonomous driving module(s) 160 can communicate with the various vehicle systems 140. In one or more arrangements, the processor(s) 205 and/or autonomous driving module(s) 160 can be operatively connected to communicate with the various vehicle systems 140 and/or individual components thereof. For example, returning to FIG. 2, the processor(s) 205 and/or the autonomous driving module(s) 160 can be in communication to send and/or receive information from the various vehicle systems 140 to control the movement, speed, maneuvering, heading, direction, etc. of the host vehicle 200. The processor(s) 205 and/or the autonomous driving module(s) 160 may control some or all of these vehicle systems 140 and, thus, the host vehicle 200 may be partially or fully autonomous.

The processor(s) 205 and/or the autonomous driving module(s) 160 may be operable to control the navigation and/or maneuvering of the host vehicle 200 by controlling one or more of the vehicle systems 140 and/or components thereof. For instance, when operating in an autonomous or semi-autonomous mode, the processor(s) 205 and/or the autonomous driving module(s) 160 can control the direction and/or speed of the host vehicle 200. The processor(s) 205 and/or the autonomous driving module(s) 160 can cause the host vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The host vehicle 200 can include one or more actuators 150. The actuators 150 can be any element or combination of elements operable to modify, adjust and/or alter one or more of the vehicle systems 140 or components thereof responsive to receiving signals or other inputs from the processor(s) 205 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The host vehicle 200 can include one or more modules, at least some of which are described herein. The modules can be implemented as computer-readable program code that, when executed by the processor(s) 205, implement one or more of the various processes described herein. One or more of the modules can be a component of the processor(s) 205, or one or more of the modules can be executed on and/or distributed among other processing systems to which the processor(s) 205 is operatively connected. The modules can include instructions (e.g., program logic) executable by one or more processor(s) 205. Alternatively, or in addition, the memory 210 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The host vehicle 200 can include one or more autonomous driving modules 160. The autonomous driving module(s) 160 can receive data from the sensor system 215 and/or any other type of system capable of capturing information relating to the host vehicle 200 and/or the external environment of the host vehicle 200. In one or more arrangements, the autonomous driving module(s) 160 can use such data to generate one or more driving scene models. The autonomous driving module(s) 160 can determine position and velocity of the host vehicle 200. The autonomous driving module(s) 160 can determine the location of obstacles, obstacles, or other environmental features including traffic signs, trees, shrubs, neighboring vehicles, pedestrians, etc.

The autonomous driving module(s) 160 can receive, and/or determine location information for obstacles (e.g., the surrounding vehicle 100) within the external environment of the host vehicle 200 for use by the processor(s) 205, and/or one or more of the modules described herein to estimate position and orientation of the host vehicle 200, vehicle position in global coordinates based on signals from a plurality of satellites, or any other data and/or signals that could be used to determine the current state of the host vehicle 200 or determine the position of the host vehicle 200 with respect to its environment for use in either creating a map or determining the position of the host vehicle 200 in respect to map data.

In one or more arrangements, the autonomous driving module(s) 160 can receive, from the surrounding vehicle marker analysis system 300, location and orientation information for any of surrounding vehicle 100 located within the external environment of the host vehicle 200 for use by the processor(s) 205. In one or more arrangements, the autonomous driving module(s) 160 can receive, from the surrounding vehicle marker analysis system 300, data associated with any features for an area located proximate any markers 110 detected on a surrounding vehicle 100. In one or more arrangements, the autonomous driving module(s) 160 can determine, based on the data received from the surrounding vehicle marker analysis system 300, one or more of a energy level (e.g., fuel or battery charge level), occupant presence state, occupant vulnerability state, cargo risk assessment, etc.

The autonomous driving module(s) 160 can determine path(s), current autonomous driving maneuvers for the host vehicle 200, future autonomous driving maneuvers and/or modifications to current autonomous driving maneuvers based on data acquired by the sensor system 215, driving scene models, the surrounding vehicle marker analysis system 300, and/or data from any other suitable source. In one or more arrangements, the autonomous driving module(s) 160 can determine path(s) for the host vehicle 200 so as to avoid particular areas of the surrounding vehicle 100 in the event of a likely collision with the surrounding vehicle 100. The autonomous driving module(s) 160 can determine one or more driving maneuvers to follow the determined path(s) for the host vehicle 200. "Driving maneuver" means one or more actions that affect the movement of a vehicle. Examples of driving maneuvers include: accelerating, decelerating, braking, turning, moving in a lateral direction of the host vehicle 200, changing travel lanes, merging into a travel lane, and/or reversing, just to name a few possibilities. The autonomous driving module(s) 160 can be configured can implement the determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can execute various vehicle functions and/or to transmit data to, receive data from, interact with, and/or control the host vehicle 200 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for operating a host vehicle on a roadway, the system comprising:
 a camera positioned to capture an image of an external environment of the host vehicle;
 one or more processors communicably coupled to the camera;
 a memory communicably coupled to the one or more processors and storing:
 a marker location determination module including instructions that, when executed by the one or more processors, cause the one or more processors to detect, using the image captured by the camera, a first marker and at least a second marker positioned on one or more surfaces of a vehicle surrounding the host vehicle, and determine at least a location of the first and second markers on the surrounding vehicle based on data encoded in each of the markers;
 an orientation determination module including instructions that, when executed by the one or more processors, cause the one or more processors to determine an orientation of the surrounding vehicle based on the location of the first and second markers; and
 an autonomous driving module including instructions that, when executed by the one or more processors, cause the one or more processors to determine a path for the host vehicle based on the orientation of the surrounding vehicle, and to control the host vehicle to follow the determined path by sending one or more control signals to one or more vehicle components to cause the host vehicle to travel along the determined path.

2. The system of claim 1, wherein the first and second markers are non-visible markers, and wherein the camera is a hyperspectral camera configured to detect the non-visible first and second markers.

3. The system of claim 1, further comprising:
a communications system configured to receive second data generated by the surrounding vehicle that is associated with at least one of the first and second markers; and wherein the memory further stores
a feature determination module including instructions that, when executed by the one or more processors, cause the one or more processors to receive, via the communications system, the second data generated by the surrounding vehicle, the data indicating a feature related to an area of the surrounding vehicle located proximate the at least one of the first and second markers, and determine, based on the second data, the feature corresponding to the area of the surrounding vehicle located proximate to the at least one of the first and second markers.

4. The system of claim 3, wherein the autonomous driving module further includes instructions that cause the one or more processors to monitor a likelihood of a collision with the surrounding vehicle based on the orientation of the surrounding vehicle with respect to the determined path, and, responsive to determining a likely collision with the surrounding vehicle, determine a collision path for the host vehicle based on the orientation of the surrounding vehicle determined by the orientation determination module and the feature for the surrounding vehicle determined by the feature determination module.

5. A method of operating a host vehicle according to an orientation of a surrounding vehicle, the method comprising:
detecting, via a camera on the host vehicle, a first marker positioned on a surface of the surrounding vehicle, the first marker including data corresponding to a location of the first marker on the surrounding vehicle;
determining the location of the first marker on the surrounding vehicle based on the data;
detecting, via the camera, a second marker positioned on another surface of the surrounding vehicle, the second marker including second data corresponding to a location of the second marker on the surrounding vehicle;
determining the location of the second marker on the surrounding vehicle based on the second data;
determining an orientation of the surrounding vehicle based on the locations of the first and second markers;
determining a path for the host vehicle based on the orientation of the surrounding vehicle; and
causing the host vehicle to follow the determined path.

6. The method of claim 5 further comprising:
receiving third data associated with the first marker from the surrounding vehicle, the third data representative of one or more features related to an area of the surrounding vehicle proximate the location of the first marker; and
determining a likelihood of collision with the surrounding vehicle.

7. The method of claim 6, wherein the third data is representative of one or more features including a fuel level of the surrounding vehicle, and wherein the determined path is a collision path based at least in part on the fuel level of the surrounding vehicle.

8. The method of claim 6, wherein the received data is representative of one or more features including an occupant presence in the area of the surrounding vehicle proximate the location the first marker, and wherein the determined path is a collision path based at least in part on the occupant presence in the area of the surrounding vehicle proximate the location of the first marker.

9. The method of claim 8, wherein the occupant presence includes a vulnerability assessment for any occupants present in the area of the surrounding vehicle proximate the location of the first marker, and wherein the collision path is further based at least in part on the vulnerability assessment.

10. The method of claim 6, wherein the third data is representative of one or more features including a hazardous cargo assessment for the area of the surrounding vehicle proximate the location of the first marker, the hazardous cargo assessment being based on any cargo present in the area of the surrounding vehicle proximate the location of the first marker, and wherein the determined path is a collision path based at least in part on the hazardous cargo assessment for the area of the surrounding vehicle proximate the location of the first marker.

11. The method of claim 5, further comprising:
determining a location of the surrounding vehicle relative to the host vehicle, and wherein determining the path for the host vehicle is further based on the determined location of the surrounding vehicle.

* * * * *